United States Patent [19]

Spada et al.

[11] Patent Number: 4,910,848
[45] Date of Patent: Mar. 27, 1990

[54] METHOD OF ASSEMBLING A BOILER UNIT HAVING PRE-ASSEMBLED WALLS

[75] Inventors: Ralph E. Spada, Canal Fulton, Ohio; Michael B. Persichilli, Charlotte, N.C.

[73] Assignee: The Babcock & Wilcox Company, New Orleans, La.

[21] Appl. No.: 301,561

[22] Filed: Jan. 25, 1989

[51] Int. Cl.⁴ .............................................. B21D 53/00
[52] U.S. Cl. .................................. 29/890.051; 29/423
[58] Field of Search ...................... 29/157.4, 423, 469; 122/6 A, 6 B, 6 C, 6 R, 235 A, 51 0; 204/9

[56] References Cited

U.S. PATENT DOCUMENTS

| | | | |
|---|---|---|---|
| 1,468,692 | 9/1923 | Baker | 29/157.4 |
| 1,481,408 | 1/1924 | Birchfield | 29/157.4 |
| 1,496,487 | 6/1924 | Peek | 29/157.4 X |
| 4,059,075 | 11/1977 | Ssinegurski et al. | 122/510 X |
| 4,255,841 | 3/1981 | Boyer et al. | 29/157.4 |

Primary Examiner—Timothy V. Eley
Assistant Examiner—Peter Vo
Attorney, Agent, or Firm—Robert J. Edwards

[57] ABSTRACT

Completely assembled wall modules including membraned tube panels, buckstays, doors, insulation and lagging for field-assembled boiler units are shipped to the installation site for field erection of the boiler unit.

4 Claims, 3 Drawing Sheets

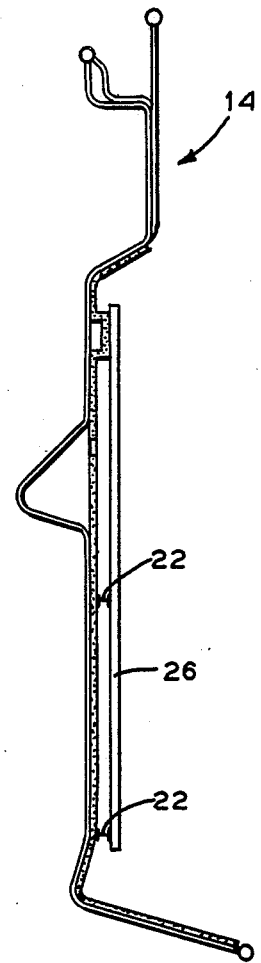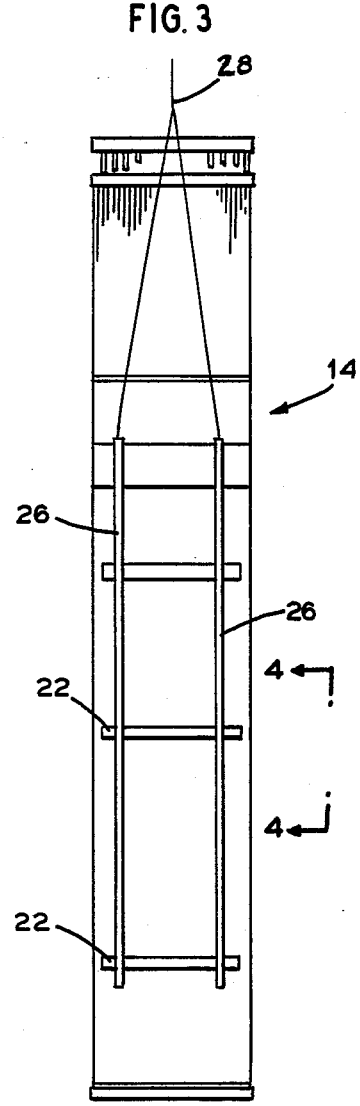

METHOD OF ASSEMBLING A BOILER UNIT HAVING PRE-ASSEMBLED WALLS

BACKGROUND OF THE INVENTION

This invention is a method of shop assembly for shipment and of field erection of large and medium size boiler furnace wall components forming the furnace envelope for boilers that are larger than the totally shop-assembled unit.

In present-day practice wall panels are generally fabricated in the shop and consist of a membrane type construction. This construction consists of flat wall sections composed of panels of single rows of tubes on centers wider than a tube diameter, connected by means of a membrane or steel bar welded to the tube on its centerline. The membrane panels, up to shipable widths and shipable lengths, are then pack-bent where required and shipped to the installation site. Field erection then comprises lifting and welding the panels together to form the furnace envelope and attaching buckstays, doors, insulation, lagging and other appurtenances.

SUMMARY OF THE INVENTION

The invention comprises furnishing and field erecting shop assembled finished wall components including membraned tube panels, buckstays, doors, insulation, lagging and other appurtenances, resulting in improved quality of product and reduction in cost and length of field construction programs.

BRIEF DESCRIPTION OF THE DRAWINGS

FIG. 2 is a schematic side view of a representative rear wall panel.

FIG. 3 is a schematic rear view of a representative rear wall panel.

DETAILED DESCRIPTION OF THE INVENTION

Figure 1:
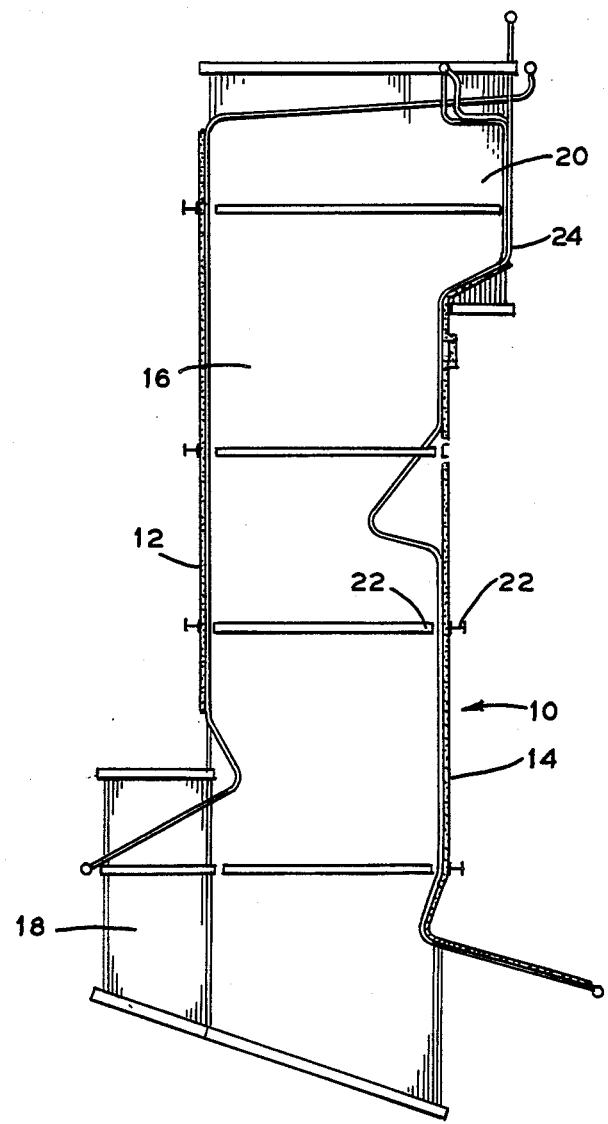
FIG. 1 is a schematic partial side view of a representative boiler unit.

Referring to FIG. 1 of the drawings, shown is a schematic side view of a boiler unit 10. The unit depicted is a mass burning refuse boiler but it should be understood that the methods and principles of the invention can be applied to designs for any type of firing. The furnace envelope includes water-cooled membraned front wall 12, rear wall 14, side walls 16, extension furnace side walls 18 and boiler side walls 20. Also shown are furnace outlet screen 24 and horizontal buckstays 22.

FIGS. 2 and 3 show rear wall modules 14 with horizontal buckstays 22 and temporary beams 26 attached at the job site. The modules are lifted by cables 28 attached to beams 26 to a vertical position for weld attachment to adjacent panels or modules.

Figure 4:
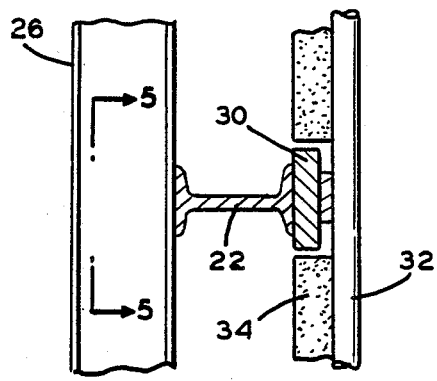
FIG. 4 is an enlarged side view taken along the lines 4—4 of FIG. 3.

FIG. 4 is an enlarged view of temporary and reusable beams 26 attached to buckstay 22 bearing against tie bar 30 and supporting membrane wall tubes 32. Insulation 34 and metal lagging, shown in FIG. 6, have been applied in the shop prior to shipment.

Figure 5:
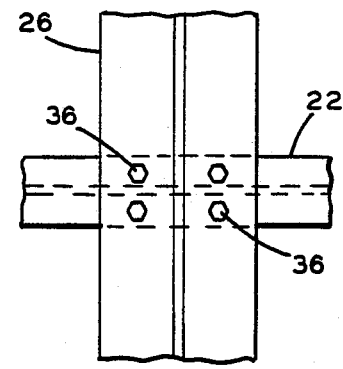
FIG. 5 is an enlarged view taken along the lines 5—5 of FIG. 4.

FIG. 5 is a detail of the method of supporting beam 26 from buckstays 22 by temporary bolts 36.

Figure 6:
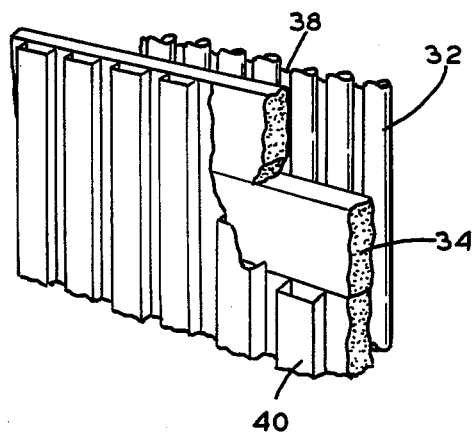
FIG. 6 is a schematic view of a membrane wall construction.

FIG. 6 shows a typical membrane wall construction comprising tubes 32 joined together by membrane bars 38. The walls thus formed are gastight and require no inner casing to contain the products of combustion. Insulation 34 is provided on the outer side of the wall, and metal lagging 40 covers the insulation.

Under present-day procedures, membrane tube wall panels will deflect or bend when lifted from a horizontal to a vertical position in erecting a unit. Panels are normally raised from quarter or third points along the panel length to minimize deflection. Deflection of the metallic panel is within elastic limits and the panel is undamaged.

The modular furnace wall panel, as conceived by the inventors, includes all parts, doors, buckstays, insulation pins, thermal barriers, insulation, lagging and any other appurtenances constituting a finished wall component as shipped to the job site. In order to handle modular or finished wall components without damage, deflection or bending must be restricted below allowable values for unfinished panels. Horizontal buckstays 22 restrain deflection in the horizontal direction and temporary beams 26 provide restraint in the vertical direction. Deflection is further limited by lifting the module from structural cross points.

While in accordance with the provisions of the statutes there is illustrated and described herein a specific embodiment of the invention, those skilled in the art will understand that changes may be made in the form of the invention covered by the claim and that certain features of the invention may sometimes be used to advantage without a corresponding use of the other features.

The embodiments of the invention in which an exclusive property or privilege is claimed are defined as follows:

1. A method of field erecting walls of a boiler unit at a job site comprising:
   assembling a plurality of membrane wall modules at a point of shipment which is separate from the job site, each module including a membrane wall containing a plurality of membrane wall tubes connected to each other by membrane bars, a plurality of buckstays connected to the membrane wall, insulation covering one side of the membrane wall and lagging covering the insulation thereby forming an assembled membrane wall module;
   shipping each assembled membrane wall module to the job site;
   attaching at least one temporary beam to the buckstays of each assembled membrane wall module for limiting deflection of each assembled membrane wall module when said assembled membrane wall module is lifted;
   lifting each assembled membrane wall module by at least one temporary beam connected thereto, into a vertical position thereby forming vertically positioned modules;
   welding adjacent vertically positioned modules to each other thereby forming the walls of a boiler unit; and
   removing the temporary beams from the walls of the boiler unit.

2. A method according to claim 1 including during assembling of the plurality of membrane wall modules, connecting the buckstays to the membrane wall of each module with the buckstays extending horizontally.

3. A method according to claim 2 including attaching two temporary beams to the buckstays of each module.

4. A method according to claim 3 including lifting each module by connecting a cable to the temporary beams of each module and lifting the cable.

* * * * *